United States Patent [19]

Taylor

[11] Patent Number: 4,896,690

[45] Date of Patent: Jan. 30, 1990

[54] PRESSURE AND THERMAL RELIEF VALVE

[76] Inventor: Julian S. Taylor, 8502-A SW. 8, Oklahoma City, Okla. 73128

[21] Appl. No.: 246,831

[22] Filed: Sep. 20, 1988

Related U.S. Application Data

[63] Continuation-in-part of Ser. No. 131,592, Dec. 11, 1987, Pat. No. 4,787,409.

[51] Int. Cl.4 ............................................. F16K 17/00
[52] U.S. Cl. ......................................... 137/73; 137/80
[58] Field of Search .................... 137/68.1, 69, 72, 79, 137/80, 73

[56] References Cited

U.S. PATENT DOCUMENTS

| | | | |
|---|---|---|---|
| 761,221 | 5/1904 | Grinnell | 137/72 X |
| 1,924,869 | 5/1933 | Lovebin et al. | 137/72 |
| 1,960,272 | 5/1934 | Lovekim | 137/73 |
| 2,370,243 | 2/1945 | Henshaw | 137/72 X |
| 3,195,647 | 7/1965 | Campbell et al. | 137/72 X |

Primary Examiner—John Fox

[57] ABSTRACT

In a thermal responsive relief valve, an elongated tubular valve body axially contains a strut secured at one end portion to the bore of the valve body and axially contained at its other end by a piston sealed with the valve body bore at one of its ends. A fusible material is interposed between one end portion of the strut and the valve member surrounding the last mentioned strut end portion.

1 Claim, 2 Drawing Sheets

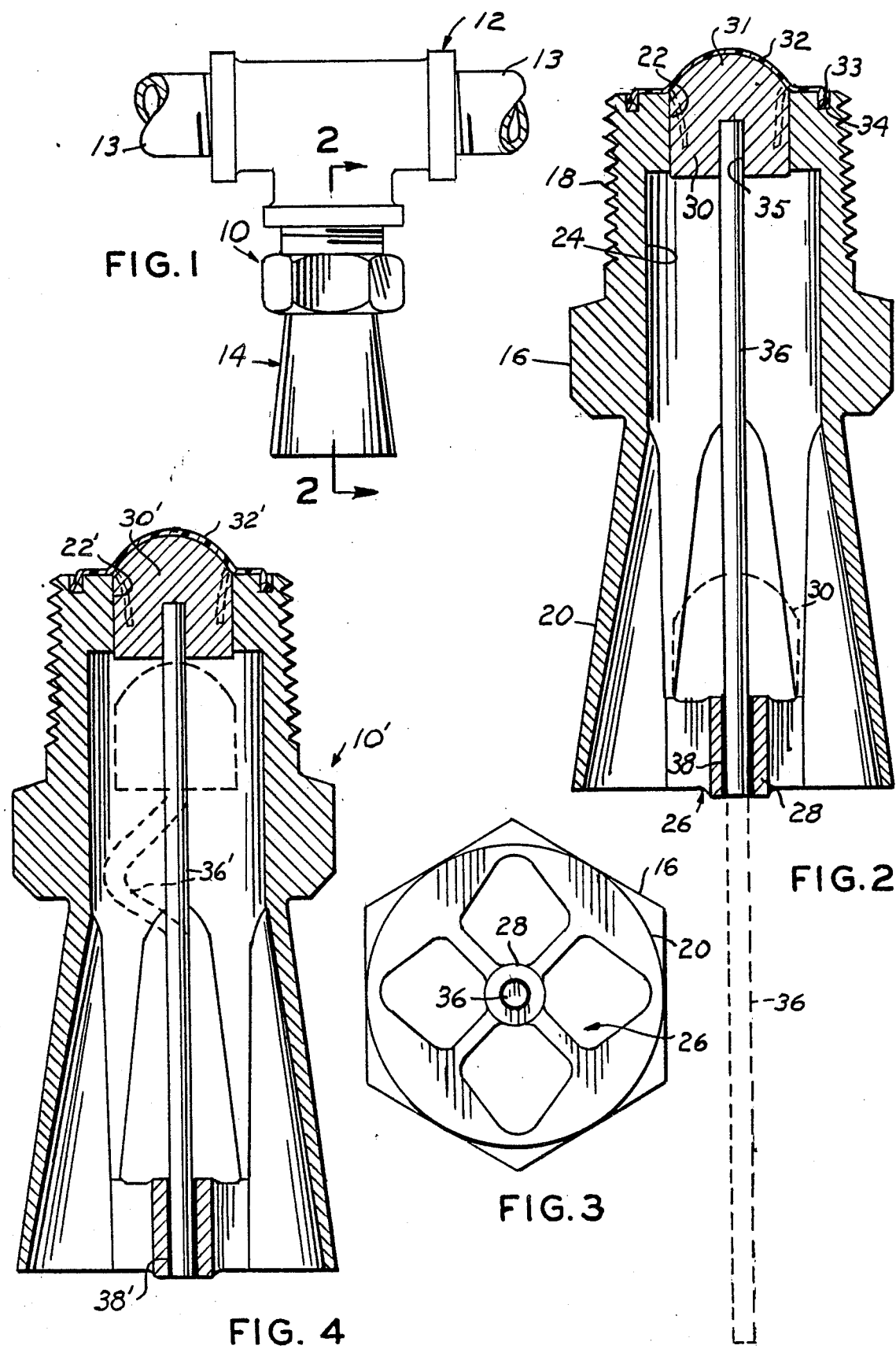

PRESSURE AND THERMAL RELIEF VALVE

CROSS REFERENCE TO RELATED APPLICATION

This application is a continuation-in-part of an application filed by me in the U.S. Patent and Trademark Office on Dec. 11, 1987, Ser. No. 07/131,592 for RUPTURE PIN VALVE SYSTEM, now U.S. Pat. No. 4,787,409.

BACKGROUND OF THE INVENTION

1. Field of the invention

The present invention relates to fluid pressure relief valves.

Relief valves are conventionally used in fluid pressure systems for the purpose of protecting the fluid pressure generating equipment, such as a cylinder, cylinder heads, bolts, pump valves, packing or cups, so that, in the event of malfunction or closing an external valve in error or excessive pressure as caused by a clogged drilling bit, the relief valve is biased to an open fluid discharge position enabling the operators to correct the malfunction without damage to the equipment.

Relief valves are also used as thermal responsive valves, for example, as a sprinkler head valve in a building sprinkler system. They are also used as a safety feature, such as excessive pressure in a hot water tank.

2. Description of the prior art

Fluid pressure relief valves presently in use and as disclosed by prior patents generally relate to valve structure which includes a valve stem or mandrel moved longitudinally in response to predetermined fluid pressure which shears a pin or ruptures a frangible disk, or the like. The pressure setting in which these valves open to release such pressure is predetermined by the pressure necessary to shear the shear pin or rupture the frangible disk. The pressure at which such a valve opens is thus predetermined by the known rating or shearing force required to shear a pin or rupture frangible disk of predetermined thickness.

Shear type valves are dangerous in that they can be rendered inoperative by a workman, tired of resetting the valve, putting more than one shear pin or nail through the shear bar on one type safety relief valve or using extra strong metal, such as an Allen wrench through the shear stem in another type shear relief valve. Rupture disks have the disadvantage of being difficult to service in the field after rupture.

This invention provides a thermally responsive relief valve in which an axial pin or strut maintains the valve closed and is released by excessive temperature allowing axial movement of the piston and opening of the valve.

SUMMARY OF THE INVENTION

An elongated valve body having a through passage, closed at one end by a piston type plug, is provided, adjacent its other end portion, with a spider supporting one end of an elongated strut or pin having its other end portion axially received by the piston. One end of the pin is secured by fusible material while its other end is embedded in a socket while heat releases the fusible material, the piston slides axially in the valve body toward the spider for opening the valve through passage.

The principal object of this invention is to provide a thermally released valve for sprinkler systems or pressure relief of hot water tanks, or the like.

BRIEF DESCRIPTION OF THE DRAWINGS

FIG. 1 is a fragmentary side elevational view of one embodiment of a thermal relief valve forming a sprinkler head;

FIG. 2 is a vertical cross sectional view, to a larger scale, taken substantially along the line 2—2 of FIG. 1;

FIG. 3 is a bottom end view of FIG. 2;

FIG. 4 illustrates another feature of the valve of FIG. 2;

DESCRIPTION OF THE PREFERRED EMBODIMENTS

Figure 6:
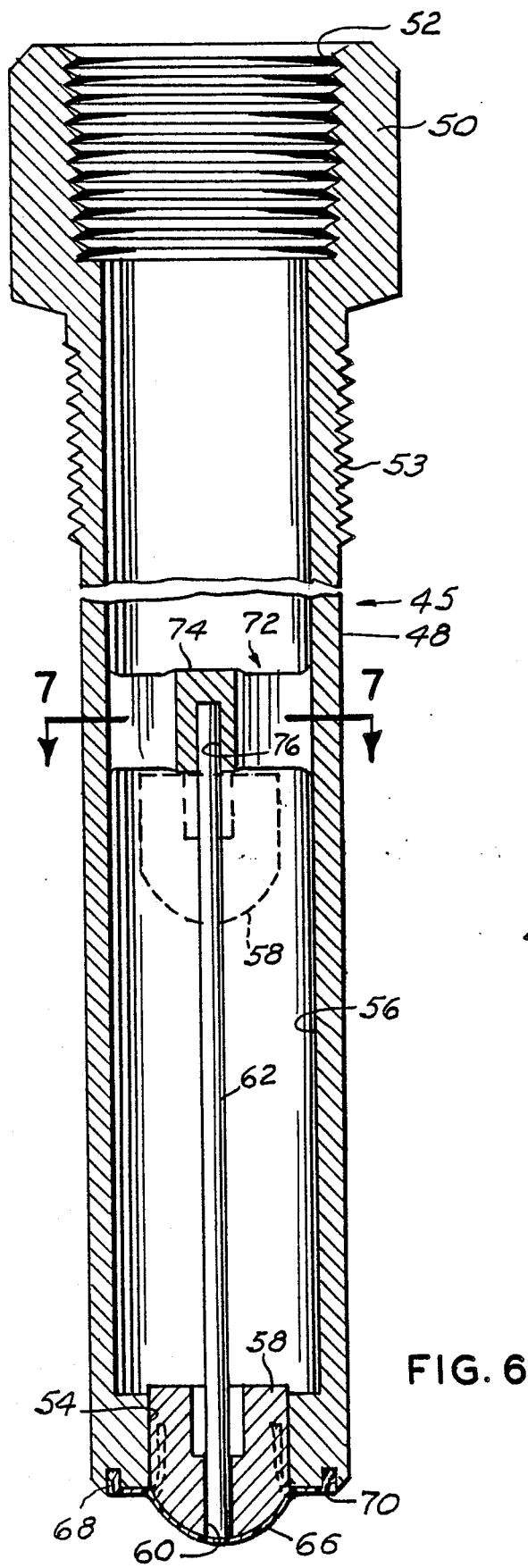
FIG. 6 is a fragmentary vertical cross sectional view, to a larger scale, taken substantially along the line 6—6 of FIG. 5; and, FIG. 7 is a horizontal sectional view taken substantially along the line 7—7 of FIG. 6.

Like characters of reference designate like parts in those figures of the drawings in which they occur.

In the drawings:

Referring more particularly to FIGS. 1 to 3, the reference numeral 10 indicates a thermal relief valve threadedly connected at one end portion with a tee 12 interposed in piping 13 and forming part of a fire sprinkler system. The valve 10 comprises an elongated generally cylindrical body 14 having wrench flats 16 intermediate its ends and external threads 18 at one end portion for connection with the tee 12 with the periphery of its other end portion diverging in a direction opposite the threads 18 to form a flared end portion, as at 20.

The valve body is axially bored, as at 22, and counterbored, as at 24, from its flared end. A spider 26, having a hub 28, extends transversely across the bore of the valve at its flared end. The bore 22 closely receives a cylindrical piston 30 having a part spherical outwardly projecting end 31. The part spherical end surface of the piston is covered by a sheet of impervious plastic material 32 having a portion of its thickened peripheral edge portions 33 closely received by an annular groove 34 formed in the adjacent end portion of the valve body. The other end of the piston is centrally bored to form a socket 35. The socket 35 nests one end portion of an elongated pin or strut 36 having its other end portion surrounded by the sleeve 28.

A heat fusible material, which may be solder 38 melting at approximately 160° F., is interposed between the bore of the sleeve and the periphery of the adjacent end portion of the strut 36.

Operation Of The First Embodiment

In the operation of the embodiment 10, when fire generated ambient temperature exceeds a predetermined degree the fusible material 38 melts and releases the adjacent end portion of the strut 36. Water pressure in the tee 12 then collapses the sheet 32 moving the piston toward the spider 26 with the strut longitudinally sliding through the sleeve 28 thus opening the valve 10. The spider 26 forms a plurality of water streams and, in cooperation with the valve flared end portion 20, disperses sprays of water, not shown, in a generally downward direction through the flared end portion of the valve.

Referring also to FIG. 4, another feature and function of the first embodiment is illustrated at 10' in which all valve parts being identical to that just described are identified by prime numerals.

In the event of a fire in the area protected by the sprinkler system which is discovered and is believed out of control and before the flames have generated sufficient heat to melt the fusible material 38', the water pressure in the pipes 13 is increased well above the normal water pressure and above the yield point of the strut 36' which forces the piston 30' downwardly out of the body bore 22'. The strut 36' bends or partially collapses, as illustrated by broken lines, while simultaneously the sheet 32' is ruptured thus, opening the valve 10' and directing a plurality of streams of water toward the flames.

Figure 5:
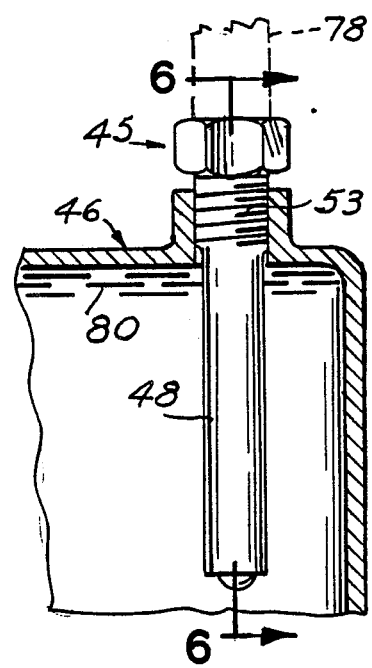
FIG. 5 is an elevational view of another embodiment of the thermal valve installed in a fragment of a water tank.
Figure 7:
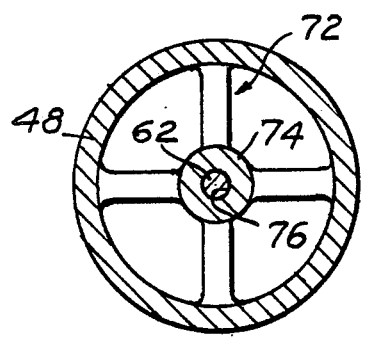

Referring to FIGS. 5, 6 and 7, the reference numeral 45 indicates another embodiment of the thermal release relief valve utilized as a hot water tank safety relief valve when installed on a hot water tank fragmentarily illustrated at 46. The valve 45 comprises an elongated body 48 having wrench flats 50 and internally threaded, as at 52, at one end portion and having external threads 53 adjacent the wrench flats. The body has a bore 54 and is counterbored, as at 56, from its threaded end. The bore 54 closely receives a piston-like plug 58 similarly centrally bored, as at 60, for loosely surrounding one end portion of an elongated strut 62 similar to the strut 36.

Heat fusible material, which may be the solder 38, is interposed between the strut end portion within the piston bore Q 60 for normally securing the strut therein. Similarly, a sheath 66, formed of impervious material, overlies the outer end portion of the piston 58 and is provided with a thickened peripheral rim 68 frictionally gripped by an annular groove 70 formed in the adjacent end portion of the valve body.

A spider 72 is secured to the wall forming the counterbore of the valve body intermediate its ends and its hub 74 is drilled from the piston end of the body to form a socket 76 nesting the other end portion of the strut 62 for normally maintaining the piston in the position shown by solid lines (FIG. 6).

Operation Of The Second Embodiment

The operation of the alternative embodiment seems obvious from the above description but briefly stated, the valve is installed in the water tank 46 and a vent pipe 78 is connected with the internal threads 52. In the event of malfunction of the water tank and the temperature of the water 80 therein reaching an excessive temperature the solder 38 melts which permits water pressure in the tank 46 to force the piston 58 toward the spider 72 in a sliding action along the strut 62, as illustrated by dotted lines (FIG. 6). This opens the bore of the valve body 48 and vents the hot water.

Obviously the invention is susceptible to changes or alterations without defeating its practicability. Therefore, I do not wish to be confined to the preferred embodiment shown in the drawings and described herein.

I claim:

1. A thermal responsive relief valve, comprising:
  a valve body having an axial passageway therethrough;
  an elongated strut having opposing ends axially disposed in said body;
  means securing one end portion of said strut to the valve body within the body passageway;
  means closing the valve body passageway including thermally released means normally surrounding the end portion opposite said one end portion of said strut and projecting beyond the body in a manner permitting longitudinal sliding movement of the closing means toward the said one end of the valve body in a passageway opening action in response to a predetermined temperature or pressure adjacent the thermally released means,
  said passageway closing means further including a piston having an axial through bore adjacent and projecting at one end portion beyond one end of the body; and,
  an impermeable flexible sheath sealing said piston one end portion with said body one end.

* * * * *